UNITED STATES PATENT OFFICE.

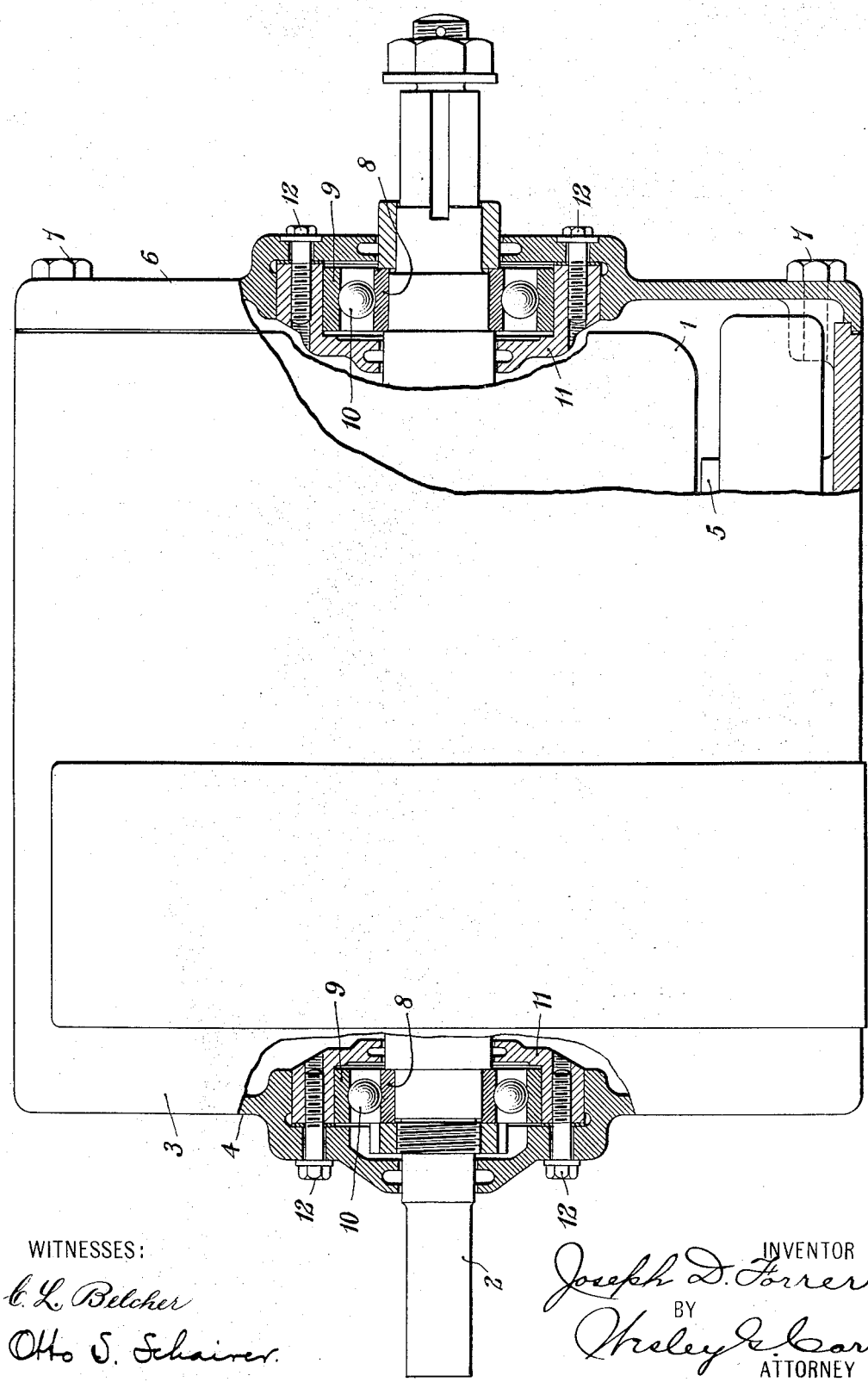

JOSEPH D. FORRER, OF PITTSBURGH, PENNSYLVANIA, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

ELECTRIC MOTOR.

1,013,149. Specification of Letters Patent. Patented Jan. 2, 1912.

Application filed January 10, 1908. Serial No. 410,243.

*To all whom it may concern:*

Be it known that I, JOSEPH D. FORRER, a citizen of the United States, and a resident of Pittsburgh, in the county of Allegheny and State of Pennsylvania, have invented a new and useful Improvement in Electric Motors, of which the following is a specification.

My invention relates to electric motors and similar devices that are provided with ball-bearings for the rotatable members thereof.

The object of my invention is to provide such a structure and arrangement of the parts of a device of the character above indicated that ready dismantling and reassembling thereof may not be interfered with by the bearings.

Electric motors that are employed for the propulsion of automobiles and for other purposes are frequently provided with ball-bearings for the armatures, a common construction for such bearings comprising two concentric sleeves with balls interposed between the same and occupying grooved races therein. In order that the said bearings may operate to the best advantage and be subject to the minimum of wear, it has been found quite essential to securely fix the inner sleeve to the armature shaft. As the motors have heretofore been constructed, however, fixing of the bearings to the shaft has rendered it extremely difficult and inconvenient to remove the armature from the remainder of the motor because of the difficulty of detaching the bearings from the shaft.

The object of the present invention is to obviate the difficulties that have heretofore resulted from this cause.

The single figure of the accompanying drawing is a view, partially in side elevation and partially in vertical section, of a motor constructed in accordance with my invention.

An armature 1 of an electric motor, in connection with which the invention may be conveniently illustrated and described, is mounted upon a shaft or axle 2, and a cylindrical casing 3 having one closed end 4 supports laminated field magnet poles 5 in operative relation to the armature 1, the open end of the casing being provided with a cover or bracket 6 that is detachably secured thereto by means of bolts 7. The end 4 of the casing and the bracket 6 are provided with central apertures through which the end of the axle 2 projects. The shaft 2 is provided with bearings at its ends each of which comprises two concentric sleeves 8 and 9 with balls 10 interposed between the same and occupying grooves or races in the opposing circumferential surfaces of the sleeves, the inner sleeves 8 being pressed upon the shaft or otherwise fixed thereto. The bearings are located within sockets provided by collars 11 that are detachably secured to the inner faces, respectively, of the end of the casing 3 and of the cover or bracket 6 by means of tap bolts 12 the heads of which are exposed upon the exterior of the casing. The outer sleeves 9 are supported by the cylindrical portions of collars 11 so that the armature is maintained in correct position with respect to field magnet.

In order to remove the armature from the casing it is necessary to remove only the bolts 7 and 12 to permit of detaching the bracket 6 from the remainder of the casing and of detaching the collar 11 from the casing and its cover. The armature may, therefore, be removed for inspection and repair without injuring or in any way disturbing the alinement of the bearings.

I claim as my invention:

1. In an electric motor, the combination with an axle, an armature carried thereby, a casing having an open end and comprising a field magnet core, and a bracket or cover for the open end of the casing, of bearings for the axle comprising concentric sleeves and interposed balls, and collars having sockets for the bearings, said collars being detachably secured to the respective interior faces of the casing and its bracket or cover.

2. The combination with a shaft, a member carried thereby, and a relatively stationary casing for the member, of bearings for the shaft comprising concentric sleeves and interposed balls, the inner sleeves being secured to the shaft, collars having sockets for the bearings and means for detachably securing said collars to the inner faces of the ends of the casing.

3. The combination with a shaft, a member carried thereby, and a relatively stationary casing for the member having internal recesses in its ends, of bearings for the shaft comprising concentric sleeves and interposed balls located in said recesses, collars having bearing sockets also seated in said recesses, and means for detachably securing said collars in the recesses.

4. The combination with a shaft, a member carried thereby, and a relatively stationary casing for the member, of bearings for the shaft comprising concentric sleeves and interposed balls, collars having sockets for the bearings and means for detachably securing said collars to the interior faces of the casing.

In testimony whereof, I have hereunto subscribed my name this 27th day of Dec., 1907.

J. D. FORRER.

Witnesses:
MALCOLM MACLAREN,
BIRNEY HINES.